[19] United States Patent
Mann et al.

(10) Patent No.: US 12,061,577 B2
(45) Date of Patent: Aug. 13, 2024

(54) ISSUE TRACKING SYSTEMS AND METHODS

(71) Applicants: Atlassian Pty Ltd., Sydney (AU); Atlassian Inc., San Francisco, CA (US)

(72) Inventors: Christopher Charles Mann, Sydney (AU); Jose Ignacio Romagnoli, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/670,093

(22) Filed: Feb. 11, 2022

(65) Prior Publication Data
US 2022/0164318 A1 May 26, 2022

Related U.S. Application Data

(63) Continuation of application No. 16/224,228, filed on Dec. 18, 2018, now Pat. No. 11,249,958.

(51) Int. Cl.
*G06F 7/00* (2006.01)
*G06F 16/176* (2019.01)
*G06F 16/18* (2019.01)
*G06Q 10/0633* (2023.01)
*G06Q 10/10* (2023.01)

(52) U.S. Cl.
CPC ...... *G06F 16/1873* (2019.01); *G06F 16/1767* (2019.01); *G06Q 10/0633* (2013.01); *G06Q 10/103* (2013.01)

(58) Field of Classification Search
CPC ............ G06F 16/1873; G06F 16/1767; G06Q 10/0633; G06Q 10/103
USPC ......................... 707/608, 638, 654, 626, 634
See application file for complete search history.

(56) References Cited

U.S. PATENT DOCUMENTS

| | | | |
|---|---|---|---|
| 2003/0005406 A1 | 1/2003 | Lin | |
| 2003/0181991 A1 | 9/2003 | Chau | |
| 2004/0064786 A1* | 4/2004 | Ikeda | G06Q 10/10 715/255 |
| 2008/0221834 A1 | 9/2008 | Damodharan et al. | |
| 2013/0246345 A1* | 9/2013 | Eisler | G06F 16/164 707/608 |
| 2015/0142498 A1* | 5/2015 | Remacle | G06Q 10/06313 705/7.23 |
| 2015/0193711 A1* | 7/2015 | Lavrov | G06F 16/13 705/7.23 |
| 2016/0378575 A1 | 12/2016 | Hansen et al. | |

\* cited by examiner

*Primary Examiner* — Md I Uddin
(74) *Attorney, Agent, or Firm* — Brownstein Hyatt Farber Schreck, LLP

(57) ABSTRACT

Described herein is a computer implemented method. The method comprises receiving, from a user device, a selected workflow message identifying a selected workflow; accessing the selected workflow from a workflow data store; evaluating, using runtime context information received from the user device, one or more secondary triggers associated with the selected workflow to determine an applicable branch of the selected triggered workflow; communicating, to the user device, branch information in respect of the applicable branch, the branch information including information in respect of one or more operations that would be performed if the selected workflow was executed.

10 Claims, 7 Drawing Sheets

400

NEW RULE

Workflow title (please enter) — 402

Workflow summary (please enter) — 404

* This rule is triggered manually ▼ — 406

* Select applicable context ▼ — 408

If these match ... — 412, 413

* [select operation] ▼ ✎

( Add condition ) — 414

Then do this ... — 416, 417

* [select operation] ▼ ✎

( Add operation ) — 418

410

( Add branch ) — 420    422 — ( Save workflow )

Figure 4

ISSUE TRACKING SYSTEMS AND METHODS

CROSS-REFERENCE TO RELATED APPLICATION(S)

This application is a continuation patent application of U.S. patent application Ser. No. 16/224,228, filed Dec. 18, 2018 and titled "Issue Tracking Systems and Methods," the disclosure of which is hereby incorporated herein by reference in its entirety.

FIELD

The present disclosure is directed to issue tracking systems and methods.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Issue tracking systems are systems that manage the creation and tracking of issues in a variety of contexts. Issue tracking systems are variously referred to as trouble ticket systems, support ticket systems, request management systems, and incident ticket systems.

Some issue tracking systems allow for certain operations to be automated. For example, when the issue tracking system detects the occurrence of a defined trigger event it automatically causes one or more operations to be performed. The implementation of such automated operations can, however, cause problems.

SUMMARY

The appended claims may serve as a summary of the invention.

BRIEF DESCRIPTION OF THE DRAWINGS

In the drawings:

FIG. 4 is an example manually triggered workflow creation user interface.

Figure 1:
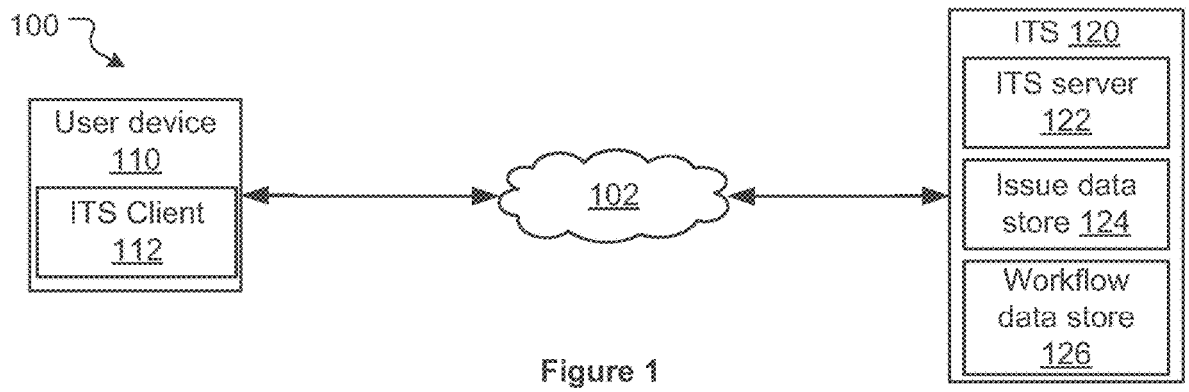
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The embodiments described herein relate to the creation and execution of workflows in issue tracking systems, and in particular to the creation and execution of manually triggered workflows.

Initially, an example environment in which aspects of the present disclosure can be implemented is described. A description of an example computer system which is configurable to perform the various operations described herein is then provided. Following this, general issue tracking system operation and workflows are described.

Environment Overview

FIG. 1 illustrates an example environment 100 in which embodiments and features of the present disclosure can be implemented. Example environment 100 includes a communications network 102 which interconnects user devices (e.g. user device 110) and an issue tracking system (ITS) 120.

User device 110 is a computer processing system with an ITS client application 112 installed thereon. User device 110 will also have other applications installed/running thereon, for example at least an operating system.

When executed by the user device 110 (e.g. by a processor such as processor 204 described below), the ITS client application 112 configures the user device 110 to provide client-side ITS functionality. This generally involves communicating (using a communication interface such as 218 described below) with the ITS 120 (and, in particular, the ITS server application 122) and performing other operations as described herein. ITS client application 112 may be a dedicated application client that communicates with an ITS application server using an API. Alternatively, ITS client application 112 may be a web browser (such as Chrome, Safari, Internet Explorer, Firefox, or an alternative web browser) which communicates with an ITS web server using http/https protocols.

User device 110 may be any form of computing device. Typically, user device 110 will be a personal computing device—e.g. a desktop computer, laptop computer, tablet computer, and in some instance even a mobile phone. While a single user device 110 has been illustrated, an environment would typically include multiple user devices 110 interacting with the ITS 120.

As discussed further below the ITS client application 112 may configure the user device 110 to provide workflow creation functionality (i.e. creating new workflows) and/or workflow use functionality (i.e. using existing ITS workflows). Workflows may be created and used by different users (using different user devices), though in many cases the same user may both create and use workflows using the same user device 110.

ITS 120 in this example includes an ITS server application 122, an ITS issue data store 124, and an ITS rule data store 126.

The ITS server application 122 comprises one or more application programs, libraries, APIs or other software elements which, when executed, configure the ITS 120 to provide server side ITS functionality—e.g. by receiving and responding to requests from ITS client applications (e.g. client application 112), storing/retrieving data from the ITS and rule data stores 124 and 126, and performing other operations as described herein.

ITS server application 122 may be a web server (such as Apache, IIS, nginx, GWS, or an alternative web server for interacting with web browser clients) or an application server (i.e. specifically programmed to interact with dedicated application clients using a defined set of application programming interface (API) calls). While ITS 120 has been illustrated with a single server application 122 it may provide multiple servers (e.g. one or more web servers and/or one or more application servers) operating on one or more computing devices/systems.

Issue data store 124 is used to store data involved in the typical operation of the ITS 120. By way of example, this may include ITS metadata defining the operation of the ITS (for example, and as discussed below, issue type definitions, issue lifecycles, user permissions and the like) and issue data (i.e. data in respect of the issues that have been entered into the ITS and are being maintained by the ITS).

Workflow data store 126 is used to store data relating to workflows, as discussed further below.

In certain embodiments, ITS 120 is a scalable system including multiple distributed server nodes connected to one or more shared data stores (e.g. shared file servers). Depending on demand from clients (and/or other performance requirements), ITS 120 server nodes can be provisioned/de-provisioned on demand to increase/decrease the number of servers offered by the ITS 120. Each ITS server 122 may run on a separate computer system and include one or more application programs, libraries, APIs or other software that implement server-side functionality. Similarly, the issue and workflow data stores 124 and 124 may run on the same computer system as an ITS server application 122 or may run on their own dedicated system(s) (accessible to ITS server application(s) 122 either directly or via a communications network).

Communications between the various systems in environment 100 are via the communications network 102. Communications network may be a local area network, public network (e.g. the Internet), or a combination of both.

While environment 100 has been provided as an example, alternative system environments/architectures are possible.

Hardware Overview

The embodiments and features described herein are implemented by one or more special-purpose computing systems or devices. For example, in environment 100 each of the user device 110 and ITS 120 is or includes a type of computing system.

A special-purpose computing system may be hard-wired to perform the relevant operations described herein. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
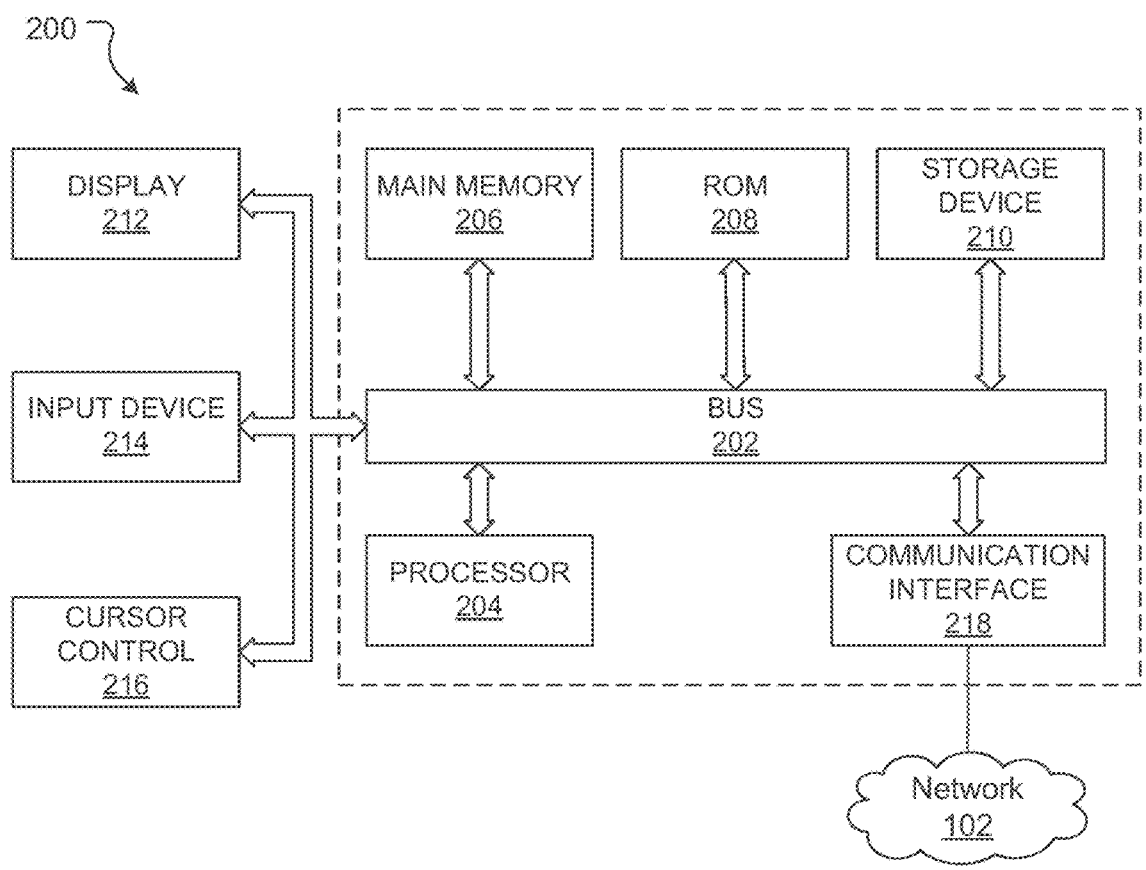
FIG. 2 is a block diagram of a computing system configurable to perform various features and embodiments of the present disclosure.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general-purpose microprocessor, a graphical processing unit, or other processing unit.

Computer system 200 also includes a main memory 206, such as a random-access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the operations described herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as ITS 120), it will typically be provided with higher end hardware allowing it to process data, access memory, and perform network communications more rapidly than, for example, a user device (such as user device 110).

Issue Tracking Systems

The ITS server application 122 (running on ITS 120) and ITS client application 112 (running on user device 110) operate together to provide an ITS and ITS functionality.

Many operations described herein as ITS operations or operations being performed by the ITS may be performed by the ITS client application 112 (operating on user device 110), the ITS server application 122 (operating on IT server system 120), or the ITS client application 112 and ITS server application 122 in cooperation. For example, ITS operations involving the display of information involve displaying information on the user device 110 (e.g. on a display such as 212) as controlled by the ITS client application 112. The data displayed, however, may be generated by the ITS client application 112 itself, or generated by the ITS server application 122 and communicated to the ITS client application 112 therefrom. As a further example, ITS operations involving user input involve the user device 110 receiving user input (e.g. at input device 214) and passing that input to the ITS client application 112. The information input may be processed by the ITS client application 112 itself or communicated by the ITS client application 112 to the ITS server application 122 to be processed by the ITS server application 122. ITS operations involving writing data to the issue or rule data stores 124/126 involve the ITS server application 122. The data written to a data store may, however, be communicated to the ITS server application 122 by the ITS client application 112.

One example of an ITS with which the present disclosure may be implemented is Jira, which is commercially available from Atlassian Pty Ltd., Sydney, Australia. For the purposes of illustrating clear examples, the present disclosure will predominantly refer to Jira, however the features described herein could be applied to alternative ITS's.

Generally speaking, an ITS provides uses with the ability to create and track issues—or, more generally, work items. A work item is an item with associated information and an associated lifecycle—i.e. a series of states through which the work item transitions over its lifecycle. The lifecycle for a given work item may be simple (e.g. an open state and a closed state) or more complex (e.g. open, closed, resolved, in progress, reopened).

The particular information and lifecycle associated with a work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g. leave request forms or the like). Many other ITS implementations in which different work items are tracked through different lifecycles are possible. For ease of reference, the following disclosure will refer to issues, however the features and operations described could apply to any other type of work item maintained by an ITS.

In order to facilitate the creation and tracking of issues, ITS 120 maintains ITS metadata (e.g. in issue data store 124) defining the operation of the ITS 100. Such metadata may include, for example: one or more issue type definitions, each issue type definition defining a field scheme or field configuration for issues of that type (e.g. the possible fields or data to be maintained by the ITS for issues of a given type); one or more lifecycle definitions, a lifecycle definition defining the lifecycle of an issue of a particular issue type (e.g. the states an issue can take and the manner in which an issue transitions between those states over its lifecycle); and user permissions (e.g. which users may create issues, view issues, amend issues, change the states of issues etc.).

ITS 120 may be configured to store a wide variety of information in respect of a given issue. By way of one simple example, an issue type definition may define the following fields: a project field storing a project to which the issue belongs; a key field storing a unique identifier for an issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). Issue ranking is described in greater detail below. The actual fields defined with respect to an issue type will depend on the requirements of a given ITS implementation, and many other fields are possible.

The lifecycle associated with a given issue will also depend on the specific requirements of the ITS implementation. By way of a simple example, a lifecycle for use in a simple helpdesk implementation could involve the following states (and appropriate allowed transitions therebetween): an open state; an in-progress state; a resolved state; a closed state; and a reopened state. Different lifecycles with different states and/or transitions between states will be appropriate for different implementations.

In order to create and progress issues in ITS 120, users interact with appropriate user interfaces provided by an ITS client application 112. For example, a user may create a new issue and provide relevant information in respect of the issue (e.g. a particular project the issue is associated with, a description, a priority, any other relevant information catered for). The ITS 120 itself will typically generate a key that can be used to uniquely identify the issue, which may be hidden from or visible to the user. Once an issue has been created a user can interact with it, for example by adding additional information to the issue (e.g. in an issue description or other field), changing the state of the issue (e.g. from in progress to resolved), assigning the issue to another person (e.g. by changing an assigned person field).

ITS Workflows

As used herein, the term workflow refers to a sequence of one or more operations that are performed when specific criteria are met.

Workflows may be defined in various ways, however will typically include a workflow trigger (i.e. one or more conditions which are automatically evaluated and, when met, trigger the workflow) and an associated workflow action (i.e. one or more operations performed when the conditions of the trigger event are met).

In the Jira example, a workflow trigger is defined by a primary trigger and one or more secondary triggers. Each secondary trigger is associated with a workflow action that is performed in the event that the combined primary and secondary triggers are met. A single workflow defines a single primary trigger, but that single primary trigger may be associated with multiple secondary trigger/action pairs. In this implementation each secondary trigger/action pair may be thought of (and will be referred to) as a workflow branch.

In the Jira example, primary triggers are defined with reference to ITS events. Secondary triggers are defined with reference to a logical test based on one or more secondary trigger conditions. When the primary trigger defined for a particular workflow occurs the one or more secondary triggers for that workflow are evaluated. If the logical test defined in respect of a particular secondary trigger evaluates as true, the workflow action associated with that secondary trigger is performed.

Table A below provides, by way of example, various primary triggers and potential secondary trigger conditions which can be combined in a logical form to make up secondary triggers. Other primary triggers and secondary trigger conditions are of course possible:

TABLE A

Example trigger conditions

| E.g. primary trigger | E.g. secondary trigger conditions |
|---|---|
| Comment added | Issue matches a certain filter |
| | Comment visibility is internal or external |
| | User type is a particular type (e.g. customer or agent) |
| | Comment contains a key phrase |
| | Comment is primary action and not the consequence of another action (for example, commenting as part of a workflow transition) |

TABLE A-continued

Example trigger conditions

| E.g. primary trigger | E.g. secondary trigger conditions |
|---|---|
| Comment edited | Issue matches a certain filter |
| | Comment visibility is internal or external |
| | User type is a particular type (e.g. customer or agent) |
| | Comment contains a key phrase |
| Issue is created | Issue matches a certain filter |
| | User type is a customer or agent |
| Issue resolution is changed | Issue matches a certain filter |
| | User type is a customer or agent |
| | Resolution change is either set or cleared |
| Status changed | Issue matches a certain filter |
| | User type is a customer or agent |
| | Status change visible to customer |
| A linked issue (on the same Jira site instance) is transitioned | Link type matches a certain type of link (for example, is related to or blocks) |
| | Issue matches a certain filter |
| | Linked issue matches a certain filter |
| | User type is a customer or agent |
| Participant added to issue | Issue matches a certain filter |
| | User type is a customer or agent |
| Organization added to Issue | Issue matches a certain filter |
| | User type is a customer or agent |
| Approval required | Issue matches a certain filter |
| | User type is a customer or agent |
| Approval complete | Approval status is set to complete |
| SLA time remaining | Issue matches a certain filter |
| Select the SLA and goal status that triggers the event | |
| Time in status | Issue status matches a filter and has been in that status for a chosen period of time. |

In the Jira context, workflows (automation) are based on the notion that primary triggers are associated with "provides" and secondary triggers are associated with "requires". Primary triggers define named keys which they are responsible for providing context around. For example, the "comment added" primary trigger mentioned above "provides" a 'comment' (the ID of the comment added), an 'issue' (an identifier of the issue the comment was added to), and a 'user' (an identifier of the user who added the comment).

Secondary triggers and actions define what they "require". For example, the "comment visibility" condition mentioned above requires "comment" context.

Together, "provides" and "requires" are used to determine at workflow definition-time the data which will be available at workflow execution-time.

The workflow action associated with a particular primary/secondary trigger combination may involve any desired operation or operations supported by the ITS. Such operations may include, for example: transitioning an issue to change its lifecycle state; adding a comment (either internal or external); alerting a user to prompt a specific user or users via an @mention; editing an issue request type; editing an issue field (e.g. issue assignee or issue priority); creating a new issue (either in the current project or another project); trigger a webhook to send a POST request; send an email. A given operation may, depending on its nature, have one or more operation variables. For example, a send email operation may have variables such as: 'to' address(es), 'cc' address(es), 'bcc' address(es), subject line, body.

One example of a workflow definition is set out in Table B:

TABLE B

Example workflow definition

| Primary trigger | Secondary trigger | Workflow Action |
|---|---|---|
| When an issue is created | IF priority = "Critical" | Add comment: "We'll have someone on it within 60 minutes"<br>AND<br>Alert user: Jane Smith |
| | ELSE IF priority = "High" | Add comment: "The team will be in touch within 4 hours" |
| | ELSE IF | Add comment: "The team will contact you soon." |

Known workflows—for example as described above—are automatically triggered. That is, the primary/secondary triggers are automatically evaluated by the ITS (typically the ITS server application 122) and, if satisfied, the corresponding actions automatically performed. In certain circumstances this is advantageous: for example, it allows certain (typically routine) sets of operations to be performed without requiring any user input—or even user knowledge.

In other circumstances, however, the automatic triggering of workflows generates problems.

For example, automatically triggered workflows can only be triggered by conditions that are known to the ITS. This prevents the ability to define a workflow that performs operations in response to an event/condition that occurs externally to the ITS (and is not somehow communicated to the ITS). As one example of this, there may be value in defining a workflow that automatically generates a specific type of issue (e.g. with a particular description, component, assignee) as part of an escalation process to a specialised team. The trigger upon which an issue should be escalated is often not knowable to the ITS, and therefore such workflow is not able to be automatically triggered.

Furthermore, when automatically triggered, users are unable to review the execution of a workflow or modify the manner in which a workflow executes: the very transparency of the automated workflows becomes a disadvantage.

In order to address these issues, the present disclosure introduces the concept of manually triggered workflows, the creation and execution of which will now be described.

Manually Triggered Workflow Creation

In the present embodiment, manually triggered workflows are similar to automatically triggered workflows as described above. For a manually triggered workflow, however, execution of the workflow is not performed automatically on the primary trigger occurring: instead, a user must manually choose to execute the workflow.

Advantageously, embodiments operate to forecast exactly what operations will be performed in the event that a workflow is executed by a user, giving the user full visibility over this and the ability to actually execute the workflow or not based on that visibility.

Furthermore, embodiments provide for manually triggered workflows to be created that have runtime configurable actions: i.e. on manually triggering a workflow a user can provide configuration information that impacts the operations performed by the workflow.

Manually triggered workflows are associated with a user interaction context which defines the user interaction context in which the workflow is made available to end users. By way of example, manually triggered workflows may be associated with an issue user interaction context (in which case the manually triggered workflow is made available to a user when the user is in an issue context), a comments user interaction context (in which case the manually triggered workflow is made available to a user when the user is in a comments context), or any other appropriate user interaction context.

In a similar fashion to automatically triggered workflows, manually triggered workflows are also associated with one or more secondary triggers—each secondary trigger defining one or more conditions that must be met in order for a particular workflow action to be made available.

Manually triggered workflows also define workflow actions. As with an automatically triggered workflow, the workflow action for a manually triggered workflow includes one or more operations that are to be performed when the workflow is triggered. Unlike an automatically triggered workflow action, however, a manually triggered workflow action may be either static or runtime configurable.

A static workflow action is made up entirely of static operations. A static operation is an operation with variables and execution defined by the creator at workflow creation (or editing of the workflow). A static operation may have variables that are automatically set at the time the workflow is run by a user, however those variables are set in accordance with the rules of the workflow and do not allow for or permit the user running the workflow to make changes.

By way of example, a workflow action may include a 'send email' operation, one variable thereof being the email subject line. A static 'send email' operation may define that the subject line of the email is populated with the issue identifier of the issue that the executing workflow is associated with: i.e. if an end user runs the workflow from an interface/view related to issue 12345, the subject of the email will be automatically set to "Issue 12345" on execution of the workflow. The user running the workflow cannot change this.

In contrast, a runtime configurable action is a workflow action with at least one runtime configurable operation. A runtime configurable operation is, in turn, an operation with one or more variables that are defined on creation of the workflow to permit (or require) user customization/configuration at the time the workflow is triggered. Returning to the above example of issue escalation, it is valuable to be able to set, at run-time, the value of the priority field of an escalated issue.

As used herein, a runtime configurable action is a workflow action with at least one runtime configurable operation. A runtime configurable operation is, in turn, an operation with at least one runtime configurable variable.

In certain embodiments, whether or not a workflow is runtime configurable is defined at a per-workflow level—that is, on creation the creator stipulates whether configuration of the action operation(s) is permitted or not. In this case, when the manually triggered workflow is run the user running the workflow is provided with the option of accepting default values for the various operation variables (as defined by the workflow creator at creation) or modifying those variables.

In alternative embodiments, whether or not a workflow is runtime configurable is defined more granularly—e.g. on a per operation or even per operation variable basis. In these embodiments, when creating the manually triggered workflow the workflow creator specifically defines which operations (or which operation variables) are runtime configurable (as well as providing default values for the variables).

Figure 3:
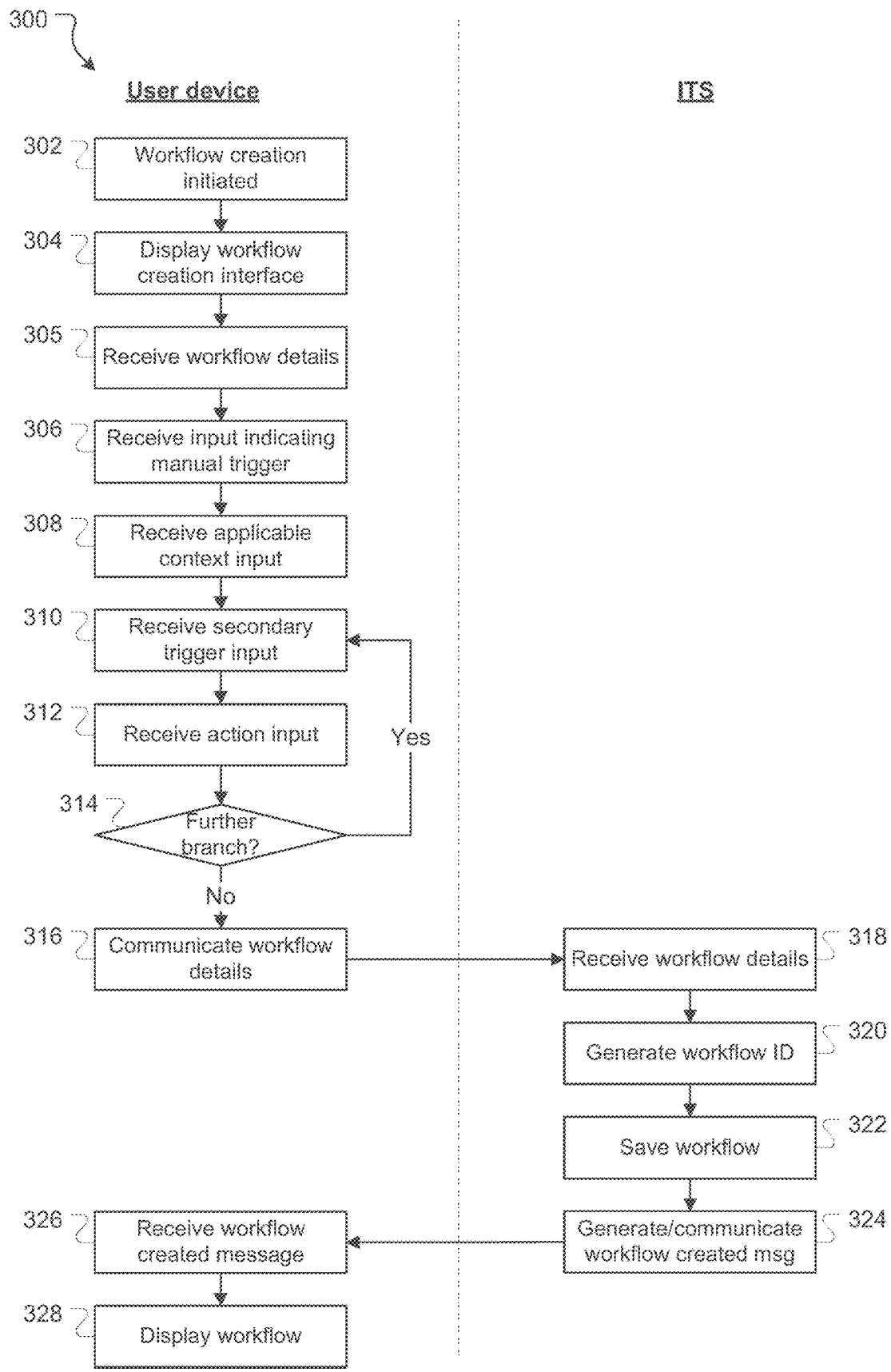
FIG. 3 is a flowchart illustrating operations performed to create a manually triggered workflow.

Referring to FIG. 3, an example manual workflow creation process 300 will be described. Generally speaking, operations described as being performed by the user device 110 in workflow creation process 300 are performed by the user device 110 under the control of ITS client application 112. Similarly, operations described as being performed by the ITS 120 are performed by the ITS 120 under the control of ITS server application 122.

At 302, workflow creation is initiated by a workflow creator. Workflow creation may be initiated in any appropriate way—for example by activation of a create workflow control presented to the user on user device 110.

At 304, the user device 110 displays a workflow creation interface.

At 305, the user device 110 receives input defining various workflow details. In the present example, these details include a title for the workflow (e.g. "Share map directions—Campus A") and a brief summary of what the workflow does (e.g. "Provide map directions to campus A and lodge visitor request form"). Other details can also be provided. For example, the creator of the workflow may wish to define a particular user that the workflow will run as. For example, a creator may define a manually triggered workflow to run as the administrator in order to provide the workflow with access to certain administrator-restricted operations.

At 306, the user device 110 receives input indicating the workflow being created is a manually triggered workflow. In certain embodiments, this may be input defining that the primary workflow trigger condition is manual execution/initiation (as opposed, for example, to an alternative event the occurrence of which would be automatically detected by the ITS and could lead to automatic workflow execution as described above).

At 308, the user device 110 receives input defining applicable user interaction context information in respect of the workflow. As noted above, the applicable user interaction context information defines the user interaction context in which the workflow will be made available to an end user. The user interaction context in which the workflow is to be made available will also determine the "provides" of the workflow: i.e. what data is provided when workflow execution or forecasting is performed. For example, if the user interaction context is the issue context, the associated "provides" may be an issue identifier (which, at workflow execution/forecasting will be the issue identifier for the specific issue being viewed) and a user identifier (which, at workflow execution/forecasting will be the user identifier for the specific user viewing the issue). Alternatively, if the user interaction context is the comments context, the associated "provides" may be an issue identifier (which, at workflow execution/forecasting will be the issue identifier for the specific issue being viewed), a user identifier (which, at workflow execution/forecasting will be the user identifier for the specific user viewing the issue), and a comment identifier (which, at workflow execution/forecasting will be the identifier for the specific comment).

While workflow creation process 300 describes a separate input step for receiving user interaction context (308), this step could be combined with receiving input indicating the workflow being created is a manually triggered workflow at 306. For example, a user could provide a single input indicating both that the workflow is to be manually triggered and the user interaction context for the workflow.

At 310, the user device 110 receives secondary trigger input. The secondary trigger input defines a logical sequence of one or more secondary trigger conditions (for example as described above).

At 312, the user device 110 receives action input. The action input defines one or more operations which are to be performed in the event that the workflow is triggered when the secondary trigger defined at 310 is met.

For each operation defined, the action input may further include configuration information in respect of one or more variables of the operation—for example default values for the variables.

At 312, the user may further define whether or not the workflow is to be runtime configurable. As described above, this may either be set at a per-workflow level or at an operation/variable level. If set at a workflow level, all operation variables are (when the workflow is triggered) made available to a user to configure—e.g. by accepting or changing the default values defined by the workflow creator. If runtime configuration is set at an operation/variable level, only those operations/variables that are defined to be runtime configurable can be changed by the user on triggering the workflow.

As noted above, the specific variables of a given operation, the type of configuration information that can be defined, and whether an operation lends itself to runtime configuration at all, will depend on the operation itself. By way of example, any of the variables of a send email operation (e.g.: the 'to' address(es), the 'cc' address(es), the 'bcc' address(es), the subject line, the email body) may be statically configured or flagged for runtime configuration. For example, the workflow creator may define a combination of static and runtime configurable variables—e.g.: a static email body with text as defined by the workflow creator; a static 'subject' (e.g. the issue identifier of the issue from which the workflow was executed); a static 'to' address that the email will be set to (for example the email address of the user executing the workflow); and a runtime configurable 'cc' address that the user executing the workflow can define at runtime.

A workflow creator may define a default value for a runtime configuration variable. In this case, if a user does not input a different value the variable is set to the default value for workflow execution.

The secondary trigger input received at 310 and associated action input received at 312 together define a single branch of the workflow being created.

At 314, the user device 110 receives user input indicating either that a further branch (i.e. an additional secondary trigger input and associated action) is to be added to the workflow or that creation of the workflow is complete. If the input indicates that a further branch is to be added, the process returns to 310. If the input indicates that workflow creation is complete, the process continues to 316.

At 316, the user device 110 communicates the workflow details (i.e. the workflow name, workflow summary, that the work flow is a manually triggered workflow, applicable context information, secondary trigger/associated action information for all defined branches) to the ITS 120 (and in particular the ITS server application 122). In alternative embodiments, the user device 110 communicates the various workflow details to the ITS 120 individually as they are entered (rather than in a single communication on the user indicating that creation of the workflow is complete).

At 318, the ITS 120 receives the workflow details from the user device 110.

At 320, the ITS 120 generates a unique identifier in respect of the workflow. In alternative embodiments, the unique workflow identifier is generated on initiation of the workflow creation process (either by the ITS 120 or the ITS client application 112).

At 322, the ITS 120 saves the workflow and associated information (e.g. a user identifier of the creator, the creation data, and any other relevant information) to the workflow data store 126.

The specific data stored with workflow and the format thereof will differ according to implementation. By way of example, however, Table C below provides one example of a JSON workflow object:

TABLE C

Example workflow format

```
{
  "id": 71,
  "ruleSetRevisionId": 185,
  "name": "At-risk SLA alert",
  "description": "Notifies an agent in a comment when an SLA is about to breach.",
  "rules": [
    {
      "id": 72,
      "when": {
        "whenHandlers": [
          {
            "id": 72,
            "data": { "metricId": "2", "thresholdTime": "1800000", "projectKey": "SD" },
            "webFormModule": "servicedesk/internal/feature/sla-when-handler/sla-when-condition",
            "provides": ["issue"],
            "iconClass": "time",
            "name": "SLA \"Time to first response\" is \"At risk (30 min remaining)\"",
            "unique": false,
            "moduleKey": "com.atlassian.servicedesk:sla-threshold-when-handler",
          }
        ],
      },
      "ifThens": [
        {
          "if": {
            "ifConditions": [
              {
                "id": 100,
                "displayHtml": "<div style=\"margin-top: 10px;\"><div>Issue matches:</div><div>All issues</div></div>",
                "label": "All issues",
                "data": { "jql": "" },
                "webFormModule": "servicedesk/internal/agent/settings/automation/modules/ruleif/jql-if-condition",
                "requires": ["issue"],
                "iconClass": "search",
                "name": "Issue matches",
                "moduleKey": "com.atlassian.servicedesk.plugins.automation.servicedesk-automation-modules-plugin:jql-if-condition",
              }
            ],
          },
          "then": {
            "thenActions": [
              {
                "id": 101,
                "displayHtml": "<div class=\"alert-user-display-html\" style=\"margin-top: -6px;\"><div style=\"display: inline-block\">Alert</div><div style=\"display: inline-block\"><span class=\"alert-user-item\"><span class=\"sd-user \" title=\"Jane Smith\"><span class=\"aui-avatar aui-avatar-small \" style=\"width: initial\"><span class=\"aui-avatar-inner\" style=\"padding: 4px 8px 0\"><img src=\"https://d2b6kerldzk1uu.cloudfront.net/df8e65c3db454a2daa8a4fe3974aecd6?s=48&d=https%3A%2F%2Fsecure.gravatar.com%2Favatar%2Fdf8e65c3db454a2daa8a4fe3974aecd6%3Fd%3Dmm%26s%3D48%26noRedirect%3Dtrue\"></img></span></span><span class=\"sd-user-value\">Jane Smith</span></span></span></div></div>",
                "label": "admin",
                "data": { "userKeys": "[\"admin\"]" },
                "webFormModule":
```

TABLE C-continued

Example workflow format

```
"servicedesk/internal/agent/settings/automation/modules/actions/alert-user/alert-user-then-
action",
                    "requires": ["issue"],
                    "iconClass": "editor-mention",
                    "name": "Alert user",
                    "moduleKey": "com.atlassian.servicedesk.plugins.automation.servicedesk-
automation-modules-plugin:alert-user-action",
                }
            ],
        },
    }
  ],
  "enabled": true
 }
],
"activeRevisionId": 72,
"metadata": {
   "projectContext": { "projectId": 10000 },
   "triggerFromOtherRules": true,
   "projectRunAsUser": {
      "userKey": "admin",
      "userDisplayName": "Jane Smith",
   }
 },
}
```

At 324, the ITS 120 generates and communicates a workflow created message to the user device 110. The workflow created message confirms that the workflow has been saved.

At 326, the user device 110 receives the workflow created message communicated from the ITS 120.

At 328, the user device 110 displays a workflow creation confirmation indication—e.g. a message or graphic indicating to a user that the workflow has successfully been created. In addition, or alternatively, device 110 may indicate successful workflow creation in other ways, for example, by playing an audio tone/message and or providing haptic feedback. Process 300 then ends.

FIG. 4 depicts one example of a workflow creation user interface 400.

Workflow creation user interface 400 includes a title field 402 in which a user can enter a title for the workflow (e.g. at 305 of process 300).

Workflow creation user interface 400 includes a summary field 404 in which a user can enter a summary for the workflow (e.g. at 305 of workflow creation process 300).

Workflow creation user interface 400 includes a primary trigger input control 406. In this example, input control 406 includes a drop-down list control which, when activated by a user, displays available primary trigger conditions. As a manually triggered workflow is being created in this example, the primary trigger is selected for manual triggering (in this case by selection of an option that reads "This rule is triggered manually"). The primary trigger input control 406 is used to receive input at 306 of workflow creation process 300.

Workflow creation user interface 400 includes a user interaction context input control 408. The user interaction context input control 408 is used to define applicable user interaction context information (e.g. at 308 of workflow creation process 300).

As noted above, in certain implementations the system is configured to receive a single input indicating both that the workflow is to be manually triggered and the user interaction context for the workflow. In this case a separate user interaction context input control 408 is not necessary. Instead, appropriate options would be provided in the primary trigger input control 406—for example options such as "Manually triggered rule: issue context", "Manually triggered rule: comments context", Manually triggered rule: . . . context", etc.

Workflow creation user interface 400 includes a branch definition pane 410 for defining a single branch of the workflow. Branch definition pane 410 includes: a secondary trigger condition input control 412 (in this case a drop-down list control allowing selection of a secondary trigger condition parameter); an add condition control 414 (which, when activated, allows second and subsequent secondary trigger conditions to be added); an operation input control 416 (in this case a drop-down list control allowing selection of an operation); and an add operation control 418 (which, when activated, allows second and subsequent operations to be added to the workflow action). Using controls 412 and 414 a user can define one or more conditions which, together, make up a secondary trigger (e.g. per 310 of workflow creation process 300). Using controls 416 and 418 a user can define one or more operations which, together, make up the workflow action corresponding to the secondary trigger (e.g. per 312 of workflow creation process 300).

In this example, each secondary trigger condition defined in a given branch definition pane is associated with a configuration control 413. Configuration control 413 is used to configure variables of the selected condition. Similarly, each operation defined in a given branch definition pane is associated with a configuration control 417. Configuration control 417 is used to configure variables of the selected operation. As described above, variables may be statically configured or configured for runtime configuration. In the present embodiment, activation of the runtime configuration control 417 launches a further operation configuration interface via which a user can configure operation variables requiring configuration—either by providing static configuration information or runtime configuration data.

Workflow creation user interface 400 includes an add branch control 420. Activation of the add branch control 420 causes second and subsequent branch definition panes 410 to be displayed for the user to define second and subsequent workflow branches if desired. Activation of the add branch control 416 is user input indicating that a further branch is to be created per 314 of workflow creation process 300.

Workflow creation user interface 400 includes a save workflow control 422. Activation of the save workflow control 422 causes the workflow to be saved.

Manually Triggered Workflow Execution

Figure 5:
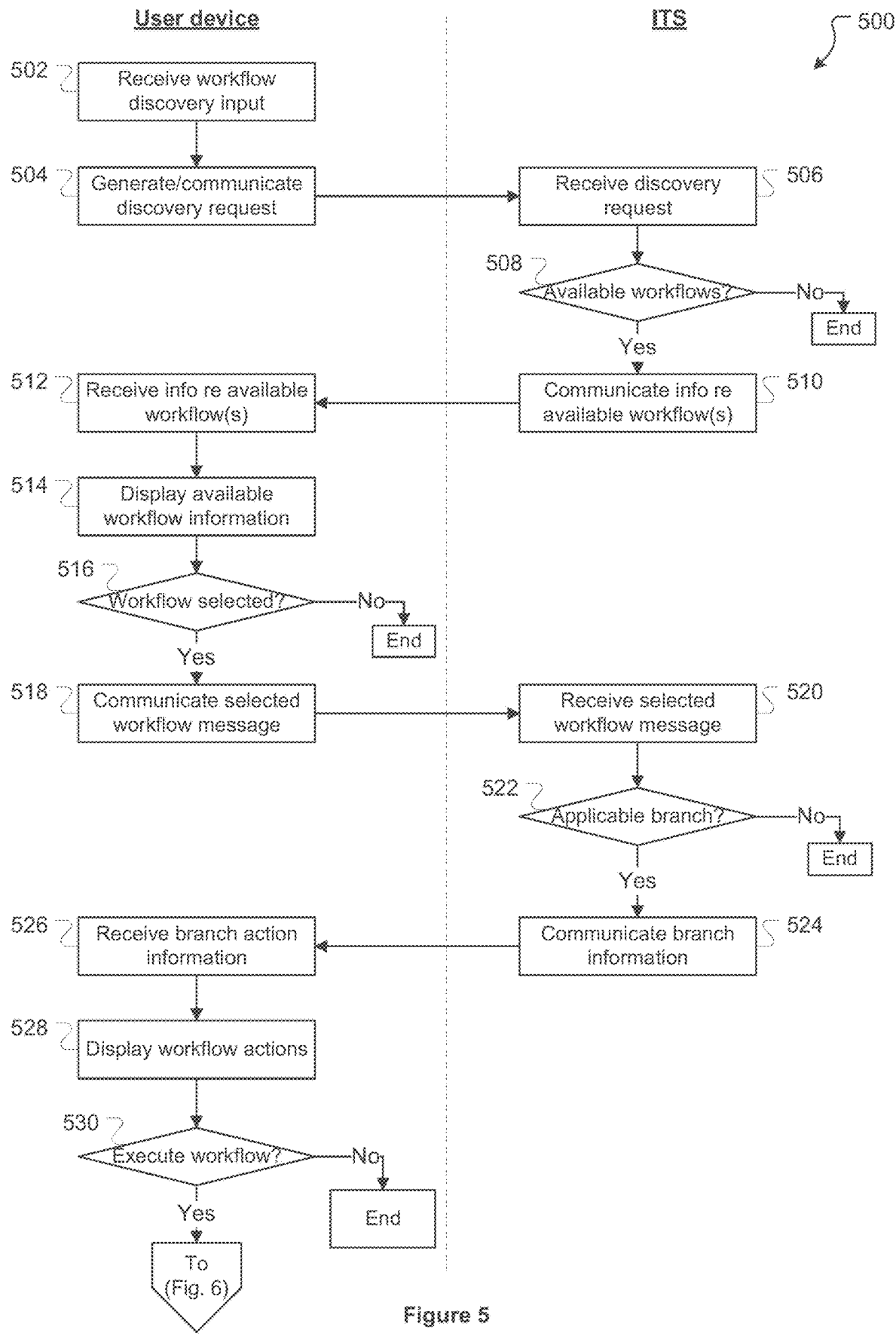
FIG. 5 and FIG. 6 provide a flowchart illustrating operations performed to execute a manually triggered workflow.

This section describes processing involved in the execution of a manually triggered workflow. This will be described with reference to the example execution process 500 of FIG. 5 and FIG. 6. Once again, operations performed by the user device 110 in this process are generally performed under the control of the ITS client application 112, and operations performed by the ITS 120 are generally performed under the control of the ITS server application 122.

At 502, the user device 110 receives user input indicating that the user may wish to initiate a manually triggered workflow. At this stage of the process, the user may not actually know whether any manually triggered workflows are available or, if available, what they are and what actions would be performed. Accordingly, this will be referred to as a workflow discovery input. The workflow discovery input may be provided, for example, by a button, a menu item (static or contextual), or any other appropriate user interface control. Such a control may be provided in various views/interfaces provided by the ITS 120 (i.e. displayed on user device 110 under control of the ITS client application 112). For example, a control to manually trigger a workflow may be provided in an issue creation view, an issue summary view, an issue detail view, and/or any other ITS view/interface.

Figure 7:
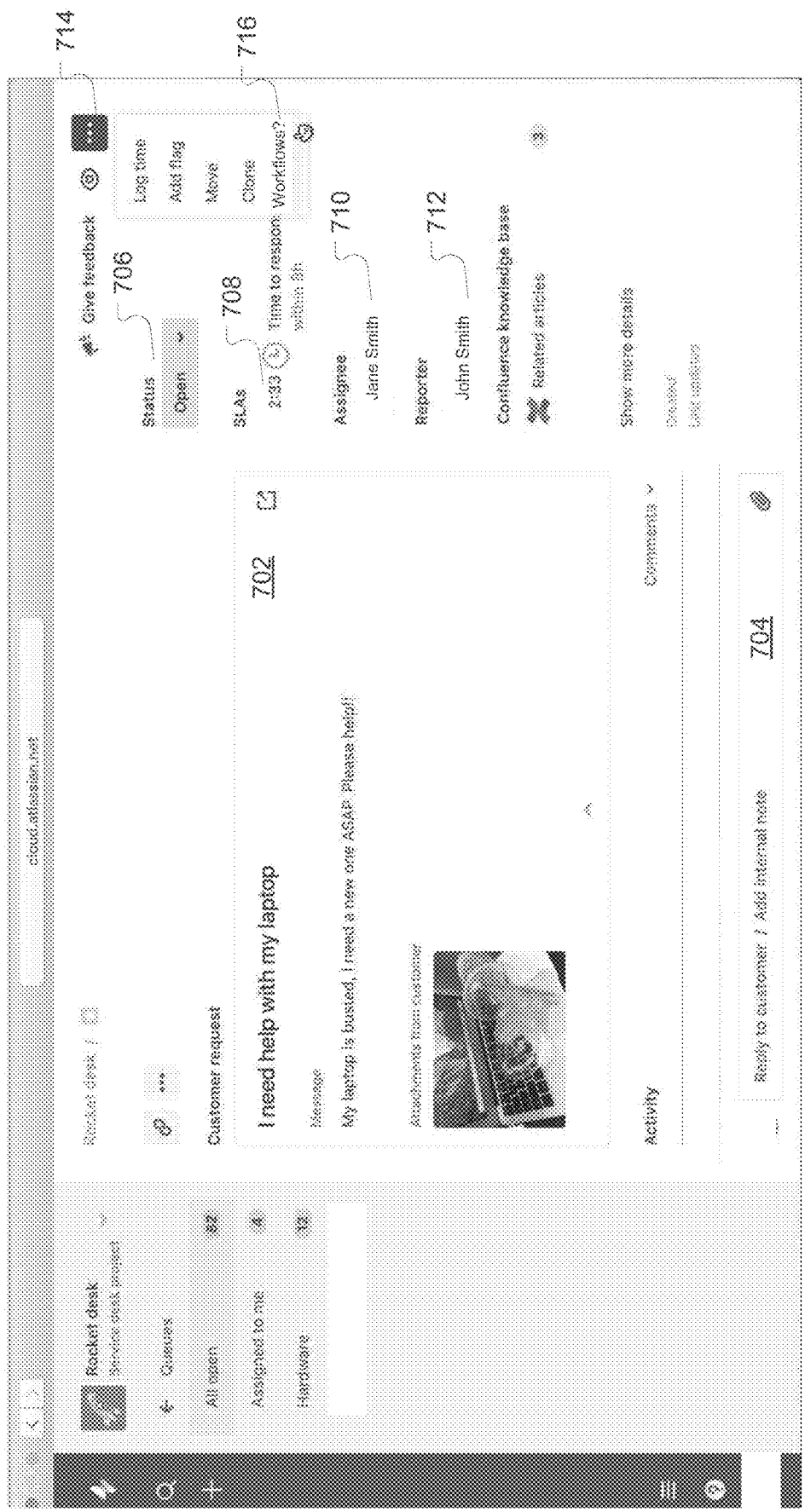
FIG. 7 is an example issue tracking system user interface from which execution of a manually triggered workflow can be initiated.

One specific example of a manually triggered workflow discovery control is provided in the example issue view interface 700 of FIG. 7. Issue view interface 700 includes various issue information, including: issue details (describing the issue) 702; a reply to customer/add internal note field 704, the issue status 706 (in this case open), an issue open time 708 (in this case 2:33), the issue assignee 710 (in this case Jane Smith), the issue reporter 712 (in this case John Smith). Issue view interface 700 further includes a drop-down control menu 702 which, when activated, displays a menu including a 'Workflows?' (i.e. workflow discovery) control item 716.

At 504, in response to a user initiating a manually triggered workflow discovery process, the user device 110 generates a manually triggered workflow discovery request and communicates this to the ITS 120 (and in particular the ITS server application 122). The manually triggered workflow discovery request includes runtime context information—the nature of which is determined by the user's current user interaction context.

Various types of runtime context information may be gathered and communicated to the ITS 120 at 504. By way of example, runtime context information may include: user details in respect of the user who wishes to run a manually triggered workflow (e.g. a user identifier); an identifier of the view/interface from which the user has activated the initiate manually triggered workflow control; an issue identifier in respect of an issue currently being viewed/actioned by the user; a issue state/status identifier; an identifier of the issue assignee; one or more recent actions that have occurred (e.g. any of the example primary trigger conditions described in Table A above, or any other actions of relevance); and/or any other information relevant to the current context. Continuing the example above, where the user interaction context is an issue context, the runtime context information will be the issue ID of the issue currently being viewed and the user ID of the user viewing the issue/invoking the workflow. As will be appreciated, providing the ITS 120 with the identifier of an issue allows the ITS 120 to access all the information associated with that issue (whether specifically communicated as runtime context information at 504 or not).

At 506, the ITS 120 receives the manually triggered workflow discovery request from the user device 110.

At 508, the ITS 120 determines whether any available workflows exist. This involves accessing the workflow data store 126 to determine whether any manually triggered workflows stored thereon have an applicable context that matches the context information received at 506 and at least one secondary trigger of the workflow is satisfied. Forecasting may be used at this point to narrow the list of available workflows.

If no manually triggered workflows are identified at 508, the ITS 120 may communicate an appropriate message back to the user device 110 (step not shown) which can then inform the user—e.g. by displaying a notification such as "no manually triggered workflows applicable to context" (step not shown). The process then ends.

If, at 508, the ITS 120 identifies that one or more manually triggered workflows are available (i.e. one or more workflows have an applicable context matching the context received at 506), processing continues to 510. At 510, the ITS 120 communicates summary information in respect of the available workflow(s) to the user device 110. In the present embodiment, the information communicated includes at least the workflow title, summary, and an identifier for each available workflow.

At 512, the user device 110 receives the summary information in respect of the available workflows from the ITS 120.

At 514, the user device 110 displays the summary information (or information based thereon) in an interface that allows a user to select a particular workflow (or cancel initiation of a manually triggered workflow).

Figure 8:
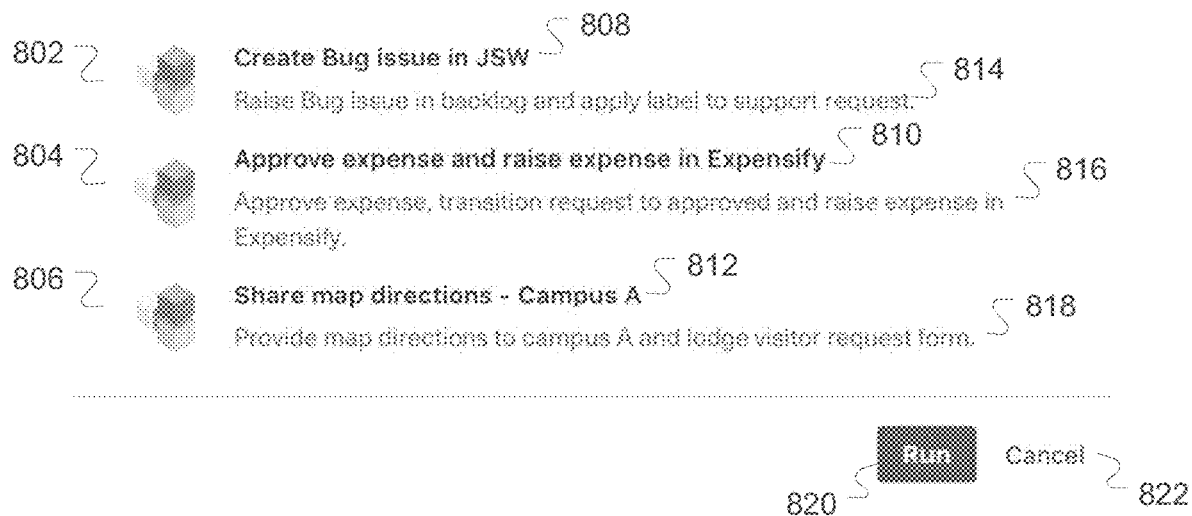
FIG. 8 is an example of an available workflow user interface.

FIG. 8 provides one example of an available workflow interface 800. Example interface 800 depicts three available workflows (802, 804, and 806 respectively), each available workflow displayed with a title (808, 810, and 812 respectively) and summary (814, 816, and 818 respectively). Interface 800 also includes a run control 820 (activation of which confirms selection of a particular workflow) and a cancel control 822 (activation of which cancels the initiation of a manually triggered workflow without selecting any of the available workflows).

At 516, the user device 110 receives user input either selecting one of the workflows displayed at 514 or cancelling the manually triggered workflow process. If the user elects to cancel, a message may be sent to the ITS 120 indicating the process has been cancelled (step not shown). The process then ends.

If, at 516, user input selecting a particular one of the workflows displayed at 514 is received, processing continues to 518. At 518, the user device 110 communicates a selected workflow message to the ITS 120. The selected workflow message includes information allowing the ITS 120 to identify the workflow selected at 516 (e.g. a workflow identifier or the like). In certain implementations the runtime context information communicated to the ITS 120 at 504 is not persisted. In this case relevant runtime context information is included in the selected workflow message and communicated to the ITS 120 again.

At 520, the ITS 120 receives the selected workflow message from the user device 110.

At 522, the ITS 120 determines which, if any, branch of the selected workflow applies. This involves evaluating the secondary triggers of the workflow to determine which (if any) secondary trigger applies to the context. In other words, each secondary trigger of the workflow is evaluated in turn by testing its one or more conditions to determine if the secondary trigger is satisfied.

In embodiments which permit non-mutually exclusive secondary triggers, the first secondary trigger evaluated to apply to the context is selected (and no further secondary triggers are evaluated). If none of the selected workflow's secondary triggers apply to the context, a message is returned to the user device 110 (step not shown) and displayed thereon (step not shown) to indicate to the user that the workflow is not, in fact, available for use. The process then ends.

If an applicable workflow branch is identified at 522, processing continues to 524. At 524, the ITS 120 communicates branch information to the user device 110. The branch information includes at least the workflow action (i.e. one or more operations) associated with the secondary trigger determined to apply at 522. Actions may provide for default values to be expanded to allow them to be tailored to the current context. For example, a template email may have a default value of "Hi ${user.name}, . . . ". This will be expanded to incorporate the current context (i.e., "Hi John, . . . ") when the ITS communicates the branch information.

At 526, the user device 110 receives the branch information from the ITS 120.

At 528, the user device 110 displays the branch information (or information derived therefrom). This allows the end user to tell exactly what operation(s) will be performed if they choose to execute/run the workflow. The branch information may be displayed in various ways but will typically be displayed in a workflow action interface that displays each operation in the workflow action along with a brief description of what the operation does. Where an operation has one or more runtime configurable variables, this can be indicated, for example by a cog/pencil icon or other graphic/visual effect.

At 530, the user device 110 receives user input either confirming that the user wishes to execute the workflow or cancelling the manually triggered workflow process.

If the user elects to cancel, the process ends without executing the workflow (i.e. forgoing performance of the operations of the workflow action). In this case an explicit message may be sent to the ITS 120 which is used by the ITS 120 to determine that the workflow is not to be executed. Alternatively (or in addition), the ITS 120 may be configured to time-out the workflow execution process if a confirmation or cancellation message is not received from the user device 110 within a defined timeout period.

Figure 6:
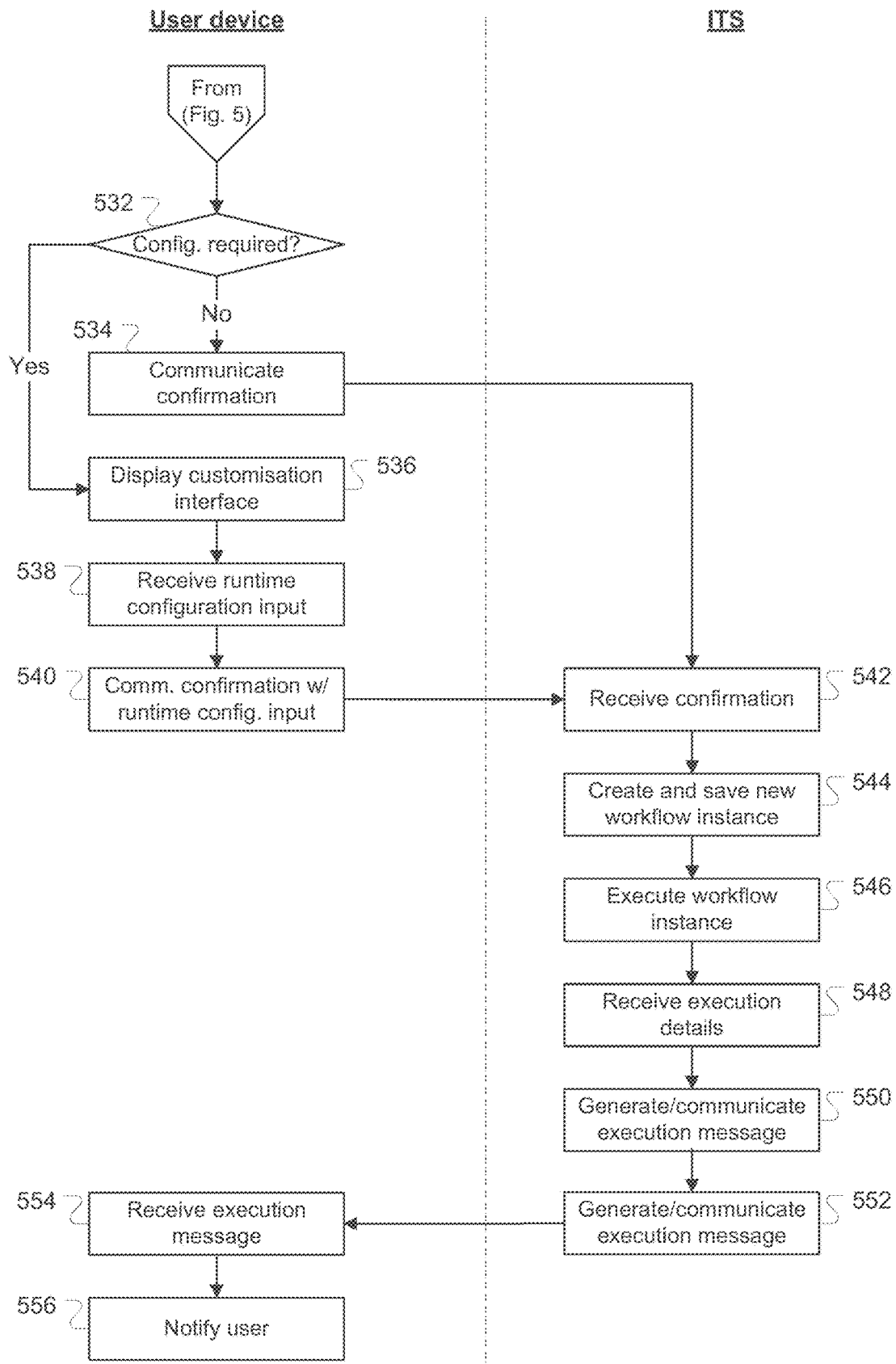

If, at 530, user input selecting a particular one of the workflows displayed at 514 is received, processing continues to 532 (FIG. 6).

At 532, the user device 110 determines whether the workflow is runtime configurable. If not, processing proceeds to 534. If so, processing proceeds to 536.

At 534, the user device 110 has determined that the workflow is not runtime configurable. In this case, the user device 110 generates and communicates an execution confirmation message to the ITS 120 indicating that the user has confirmed the workflow should be executed. Processing then continues to 542. The user may, of course, elect to instead cancel performance of the workflow (here or at any other point in the process).

At 536, the user device 110 has determined that the workflow is runtime configurable. In this case, the user device 110 displays a customization interface. The customization interface displays at least the one or more runtime configurable operations and their runtime configurable variables, allowing the user to input configuration information in respect thereof (and provide read-only values for any non-user-configurable variables). As noted above, in some cases default values may be provided for runtime configurable variables. In this case the default value for the variable is displayed in the customization interface and, if not changed by the user, returned as the user defined value for that variable.

At 538, the user device 110 receives runtime configuration input. The runtime configuration input provides user defined values for runtime configurable variables that the user wishes to define. For runtime configurable variables with default values, no user input is interpreted as an indication that the default value should be used.

At 540, the user device 110 generates and communicates an execution confirmation message to the ITS 120. In this case, the execution confirmation message indicates that the user has confirmed the workflow should be executed and also includes user defined (or, absent user definition, default) values for the runtime configurable variables as received at 538. Processing then continue to 542.

At 542, the ITS 120 receives an execution confirmation message (either from 532 or 540).

At 544, the ITS 120 creates a new workflow instance (also referred to as a workflow revision). The new workflow instance is assigned a new (unique) identifier and is effectively the manually triggered workflow selected for execution as configured by the context and any runtime configurable variable definitions (together defining which secondary trigger applies and the specific configuration of the action operation variables). So configured, the new workflow instance can be considered an automatically executed workflow that has already been triggered—insofar as a user has confirmed execution, the execution context is known (and now written into the workflow), and any runtime configurable variables have been defined (and, again, written into the workflow). The new workflow instance is saved to the workflow data store 126.

Table D below provides an example JSON object in respect of a new workflow instance. The example of Table D follows on from the example provided in Table C above. As can be seen, in the Table D example conditions have been removed as these have been pretested and the actual execution branch selected.

TABLE D

Example new workflow instance (revision)

{
  "id": 71,
  "ruleSetRevisionId": 203,
  "name": "At-risk SLA alert",
  "description": "Notifies an agent in a comment when an SLA is about to breach.", TABLE D-continued Example new workflow instance (revision)

```
    "rules": [
      {
        "id": 72,
        "when": {
          "whenHandlers": [
            {
              "id": 72,
              "data": { "metricId": "2", "thresholdTime": "1800000", "projectKey": "SD" },
              "webFormModule": "servicedesk/internal/feature/sla-when-handler/sla-when-condition",
              "provides": ["issue"],
              "iconClass": "time",
              "name": "SLA \"Time to first response\" is \"At risk (30 min remaining)\"",
              "unique": false,
              "moduleKey": "com.atlassian.servicedesk:sla-threshold-when-handler",
            }
          ],
        },
        "ifThens": [
          {
            "if": {
              "ifConditions": [ ],
            },
            "then": {
              "thenActions": [
                {
                  "id": 101,
                  "displayHtml": "<div class=\"alert-user-display-html\" style=\"margin-top: -6px;\"><div style=\"display: inline-block\">Alert</div><div style=\"display: inline-block\"><span class=\"alert-user-item\"><span class=\"sd-user \" title=\"Jane Smith\"><span class=\"aui-avatar aui-avatar-small \" style=\"width: initial\"><span class=\"aui-avatar-inner\" style=\"padding: 4px 8px 0\"><img src=\"https://d2b6kerldzk1uu.cloudfront.net/df8e65c3db454a2daa8a4fe3974aecd6?s=48&d=https%3A%2F%2Fsecure.gravatar.com%2Favatar%2Fdf8e65c3db454a2daa8a4fe3974aecd6%3Fd%3Dmm%26s%3D48%26noRedirect%3Dtrue\"></img></span></span><span class=\"sd-user-value\">Jane Smith</span></span></span></div></div>",
                  "label": "admin",
                  "data": { "userKeys": "[\"admin\"]" },
                  "webFormModule": "servicedesk/internal/agent/settings/automation/modules/actions/alert-user/alert-user-then-action",
                  "requires": ["issue"],
                  "iconClass": "editor-mention",
                  "name": "Alert user",
                  "moduleKey": "com.atlassian.servicedesk.plugins.automation.servicedesk-automation-modules-plugin:alert-user-action",
                }
              ],
            },
          }
        ],
        "enabled": true
      }
    ],
    "activeRevisionId": 185,
    "metadata": {
      "projectContext": { "projectId": 10000 },
      "triggerFromOtherRules": true,
      "projectRunAsUser": {
        "userKey": "admin",
        "userDisplayName": "Jane Smith",
      }
    },
}
```

At 546, the ITS 120 executes the workflow instance created and saved at 544. Execution of the workflow may be by any appropriate mechanism—for example an existing mechanism used for executing automatically triggered workflows. In the Jira example, the workflow instance is executed by passing its identifier to an event handler which handles execution.

At 548, the ITS 120 receives execution details in respect of now executed workflow. Where execution of the workflow is handled by another process/system, the workflow execution information recorded at 548 may be generated by that other process/system and communicated back to the ITS 120 once the workflow has finished executing. Various details in respect of the workflow execution may be received, for example the date/time of execution, the result of the execution/operations performed, any error messages generated in attempting to perform the workflow action, etc.

At 550, the ITS 120 generates and saves a workflow execution record. The record may be saved to the workflow data store 126 or an alternative data store keeping a record of workflow executions. The workflow execution record may include various details in respect of the workflow execution, for example the workflow identifier, execution details received at 548, and/or any other details in respect of the executed workflow. The execution record provides an auditable/searchable record of the execution. Furthermore, as the execution record is in respect of the new workflow created at 544 (as opposed, for example, to the original manually triggered workflow on which the new workflow was based) there is no ambiguity as to what was actually executed: the context and runtime configurable operations are written into the workflow that was executed.

The specific data stored in an execution record will depend on the specific implementation. By way of example, however, Table E below provides one example of a workflow execution record format:

TABLE E

Example workflow execution record format

```
{
  "id": 1,
  "executionStartTime": 1529033656167,
  "whens": [
    {
      "id": 257,
      "error": false,
      "status": "SUCCESS",
      "triggerConfigurationId": 72
    }
  ],
  "ifThens": [
    {
      "ifConditions": [ ],
      "thenActions": [
        {
          "id": 259,
          "actionConfigurationId": 101,
          "status": "ERROR",
          "message": "Permission denied"
        }
      ]
    }
  ]
}
```

At 552, the ITS 120 generates an execution message and communicates this to the user device 110. The execution message provides information to the user regarding the workflow execution. By way of example, the execution message may be that the workflow has been executed (potentially with a summary of the operations that were performed) or that the workflow failed to execute (and, potentially, what failed/what caused the failure).

At 554, the user device 110 receives the execution message from the ITS 120.

In certain implementations, workflow execution is handled asynchronously. In such implementations, instead of the ITS communicating an execution message to the user device 110, the user device 110 polls (for a predetermined period of time) the ITS 110 to see whether an execution record associated with the workflow exists. If no execution record exists by the timeout the workflow is deemed not to have been executed.

At 556, the user device 110 notifies the user of the workflow execution. The notification includes or is otherwise based on information received in the execution message at 554. The process then ends.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
    causing display of a workflow creation interface on an electronic display of a first client device;
    receiving from the first client device, workflow details of a user-defined workflow for execution on an issue tracking system for one or more issues managed by the issue tracking system, the workflow details defining a runtime configurability of the user-defined workflow, the run-time configurability comprising:
        user interaction context information defining one or more conditions to be satisfied for the user-defined workflow to be made available for selection on a client device;
        a trigger condition comprising interaction context information defining one or more conditions that cause the user-defined workflow to be performed, wherein the one or more conditions are automatically evaluated; and
        an action input defining one or more operations that are performed in response to the trigger condition being satisfied;
    causing, by the issue tracking system, automatic creation of a record corresponding to the user-defined workflow and the workflow details in a workflow data store that is communicatively coupled with a backend of the issue tracking system, the record comprising a unique workflow identifier that is automatically generated as part of the creation of the record; and
    causing display on the first client device a confirmation of the creation of a workflow data object corresponding to the user-defined workflow; and receiving, from a second client device, a workflow discovery input for a particular issue managed by the issue tracking system, the workflow discovery input comprising context information including a user identifier associated with a user of the second client device, and an issue identifier corresponding to the particular issue;

in response to receiving the workflow discovery input, automatically communicating the received workflow discovery input to the backend of the issue tracking system;

in response, to determining that the workflow discovery input satisfies the one or more conditions of the user interaction context information, sending one or more user-defined workflows including the user defined workflow to the second client device, the one or more user-defined workflows identified by the backend of the issue tracking system using respective unique workflow identifiers;

causing display of the received one or more user-defined workflows on an electronic display of the second client device;

receiving, from the second client device, a user selection of the user-defined workflow from the displayed one or more user-defined workflows;

in response to receiving the user selection of the user-defined workflow, checking compatibility of the user-defined workflow with respect to the particular issue; and executing, by the issue tracking system, the user-defined workflow, the executing comprising causing the one or more operations defined by the user-defined workflow to be automatically executed in relation to the particular issue.

2. The computer-implemented method of claim 1, wherein:

the user interaction context is an issue context comprising at least: an identifier of the issue, an identifier of the user, or at least two or more trigger conditions.

3. The computer-implemented method of claim 2, wherein a first trigger condition of the two or more trigger conditions corresponds with a type of a user action with respect to the issue, and a second trigger condition of the two or more trigger conditions corresponds with content of the user action with respect to the issue.

4. The computer-implemented method of claim 1, wherein in accordance with the user-defined workflow being runtime configurable, the runtime configurability of the manual workflow is specified at a workflow level, or at an operation or a variable level.

5. The computer-implemented method of claim 1, wherein in accordance with the user-defined workflow being runtime configurable, a default value is provided by the user of the first client device creating the user-defined workflow for an operation or a variable of user-defined workflow that is configured by the user of the first client device as a runtime configurable operation or a runtime configurable variable.

6. The computer-implemented method of 5, wherein in accordance with the user-defined workflow being runtime configurable, the selected user-defined workflow is executed using the default value for the operation or the variable of the user-defined workflow as set by the user of the first client device creating the user-defined workflow, or using a new value for the operation or the variable of the user-defined workflow as set by the user of the second client device executing the user-defined workflow.

7. A system, comprising:
at least one memory storing instructions;
at least one datastore; and
at least one processor configured to execute the stored instructions to perform operations comprising:

causing display of a workflow creation interface on an electronic display of a first client device;

receiving, from the first client device, workflow details of a user-defined workflow for execution on the system for one or more content items managed by the system, the workflow details defining a runtime configurability of the user-defined workflow, the run-time configurability comprising:

user interaction context information defining one or more conditions to be satisfied for the user-defined workflow to be made available for selection on a client device;

a trigger condition comprising interaction context information defining one or more conditions that cause the user-defined workflow to be performed, wherein the one or more conditions are automatically evaluated; and an action input defining one or more operations that are performed in response to the trigger condition being satisfied;

causing, by the system, automatic creation of a record corresponding to the user-defined workflow and the workflow details in the at least one datastore in accordance with the received workflow details of the user-defined workflow, the record comprising a unique workflow identifier that is automatically generated as part of the creation of the record;

causing, display on the first client device, a confirmation of the creation of a workflow data object corresponding to the user-defined workflow;

receiving, from a second client device, a workflow discovery input for a particular content item managed by the system, the workflow discovery input comprising context information including a user identifier associated with a user of the second client device, and an identifier corresponding to the content item;

in response, to determining that the workflow discovery input satisfies the user interaction context information, sending one or more user-defined workflows including the user defined workflow to the second client device, the one or more user-defined workflows identified by the backend of the system using respective workflow identifiers;

causing display of the retrieved one or more user-defined workflows an electronic display of the second client device;

receiving, from the second client device, a user selection of the user-defined workflow from the displayed one or more user-defined workflows;

in response to receiving the user selection of the user-defined workflow, checking compatibility of the user-defined workflow with respect to the particular content item; and executing, by the system, a new instance of the user-defined workflow, the executing comprising causing the one or more operations defined by the user-defined workflow to be automatically executed in relation to the particular content item.

8. The system of claim 7, wherein the system is an issue tracking system, and the content item is an issue being managed by the issue tracking system.

9. The system of claim 8, wherein the user interaction context is an issue context comprising at least: an identifier of the issue, an identifier of the user, or at least two or more trigger conditions.

10. The system of claim 9, wherein a first trigger condition of the two or more trigger conditions corresponds with a type of a user action with respect to the issue, and a second trigger condition of the two or more trigger conditions corresponds with content of the user action with respect to the issue.

* * * * *